US009213423B2

(12) United States Patent
Bell

(10) Patent No.: US 9,213,423 B2
(45) Date of Patent: Dec. 15, 2015

(54) METHOD AND SYSTEM FOR DETERMINING STYLUS TILT IN RELATION TO A TOUCH-SENSING DEVICE

(71) Applicant: Thomas Bell, Hampshire (GB)

(72) Inventor: Thomas Bell, Hampshire (GB)

(73) Assignee: Atmel Corporation, San Jose, CA (US)

( * ) Notice: Subject to any disclaimer, the term of this patent is extended or adjusted under 35 U.S.C. 154(b) by 160 days.

(21) Appl. No.: 14/026,466

(22) Filed: Sep. 13, 2013

(65) Prior Publication Data

US 2015/0077403 A1 Mar. 19, 2015

(51) Int. Cl.
*G06F 3/0354* (2013.01)

(52) U.S. Cl.
CPC .................................. *G06F 3/03545* (2013.01)

(58) Field of Classification Search
None
See application file for complete search history.

(56) References Cited

U.S. PATENT DOCUMENTS

| 7,663,607 | B2 | 2/2010 | Hotelling | |
|---|---|---|---|---|
| 7,875,814 | B2 | 1/2011 | Chen | |
| 7,920,129 | B2 | 4/2011 | Hotelling | |
| 8,031,094 | B2 | 10/2011 | Hotelling | |
| 8,031,174 | B2 | 10/2011 | Hamblin | |
| 8,040,326 | B2 | 10/2011 | Hotelling | |
| 8,049,732 | B2 | 11/2011 | Hotelling | |
| 8,179,381 | B2 | 5/2012 | Frey | |
| 9,035,919 | B2 * | 5/2015 | Cooke | ........................... 345/179 |
| 2009/0315854 | A1 | 12/2009 | Matsuo | |
| 2011/0298709 | A1* | 12/2011 | Vaganov | ........................ 345/158 |
| 2012/0242588 | A1 | 9/2012 | Myers | |
| 2012/0242592 | A1 | 9/2012 | Rothkopf | |
| 2012/0243151 | A1 | 9/2012 | Lynch | |
| 2012/0243719 | A1 | 9/2012 | Franklin | |
| 2012/0327042 | A1* | 12/2012 | Harley et al. | .................. 345/179 |
| 2013/0076612 | A1 | 3/2013 | Myers | |
| 2014/0204038 | A1* | 7/2014 | Ohba et al. | ..................... 345/173 |
| 2014/0267186 | A1* | 9/2014 | Kreek et al. | ................... 345/179 |
| 2014/0267187 | A1* | 9/2014 | Cooke | ........................... 345/179 |

FOREIGN PATENT DOCUMENTS

WO  WO 2012/129247  9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Joseph Haley
*Assistant Examiner* — Emily Frank
(74) *Attorney, Agent, or Firm* — Baker Botts L.L.P.

(57) ABSTRACT

In one embodiment, a method includes receiving, at each of at least four receivers of a stylus, a signal from an electrode line oriented along a first axis of a touch-sensing device and determining, by a processor of the stylus, a signal strength of the signal at each of the at least four receivers of the stylus. The received signal has a different signal strength at each of the at least four receivers. The method includes determining, by the processor of the stylus, a tilt direction of the stylus based on the determined signal strength at a plurality of the at least four receivers, and providing, by a transmitter of the stylus, a response signal to the touch-sensing device. The tilt direction includes a direction of the stylus along a second axis of the touch-sensing device and the second axis is oriented in a different direction than the first axis.

19 Claims, 6 Drawing Sheets

METHOD AND SYSTEM FOR DETERMINING STYLUS TILT IN RELATION TO A TOUCH-SENSING DEVICE

TECHNICAL FIELD

This disclosure generally relates to touch-sensing devices, and more particularly to a method and system for determining stylus tilt in relation to a touch-sensing device.

BACKGROUND

Conventional touch-sensing devices may detect the presence and location of a touch or the proximity of an object (such as a user's finger or a stylus) within a touch-sensitive area. A touch-sensing device may be, or may be associated with, a desktop computer, laptop computer, tablet computer, personal digital assistant (PDA), smartphone, satellite navigation device, portable media player, portable game console, kiosk computer, point-of-sale device, household appliance, or other suitable device.

Conventional touch-sensing devices may utilize different types of touch-sensitive technologies such as, for example, resistive touch-sensing devices, surface acoustic wave touch-sensing devices, and capacitive touch-sensing devices. In capacitive touch-sensing devices, when an object touches or is brought in proximity to an electrode array of a touch-sensing device, a change in capacitance may occur within the electrode array at the location of the touch or proximity. The touch-sensing device may then process the change in capacitance to determine the position of the object.

DESCRIPTION OF EXAMPLE EMBODIMENTS

Generally, an active stylus may report its position by transmitting a signal to a touch-sensing device using a transmitter at the end of the stylus. Ideally, only the position of the tip of the transmitter, rather than the width of the entire transmitter, is reported. However, when a person is writing, he or she will likely tilt the stylus left or right, which brings the width of the transmitter closer to the touch-sensing device. Given the portable nature of modern devices, most people also tilt the device. This tilting causes erroneous position measurements because the stylus position is determined from the width of the transmitter, which may be up to four millimeters wide, rather than just the tip, which may just be a millimeter wide. In other words, due to the direction and angle of the tilt, a right-handed person's stylus position is often erroneously reported off to the right, while a left-handed person's stylus position is often erroneously reported off to the left.

Accordingly, aspects of the present disclosure include, in one embodiment, a method for determining a stylus tilt direction in relation to a touch-sensing device. At least four receivers each receive a signal from an electrode line oriented along a first axis of a touch-screen. The stylus's processor determines a signal strength of the received signal at each of the receivers. Generally, the signal may have a different signal strength at each of the receivers because each receiver is positioned at a different distance from the electrode line that emitted the signal. The processor determines a tilt direction of the stylus based on the determined signal strength at a plurality of the receivers. The tilt direction may be the direction of the stylus along a second axis of the touch-sensing device, which is oriented in a different direction than the first axis. Once the tilt direction is determined, the stylus may provide a response signal to the touch-sensing device, which indicates the tilt direction of the stylus. In this manner, the position of the stylus may be corrected using the tilt-direction information in the response signal to improve touch-position accuracy.

Figure 1:
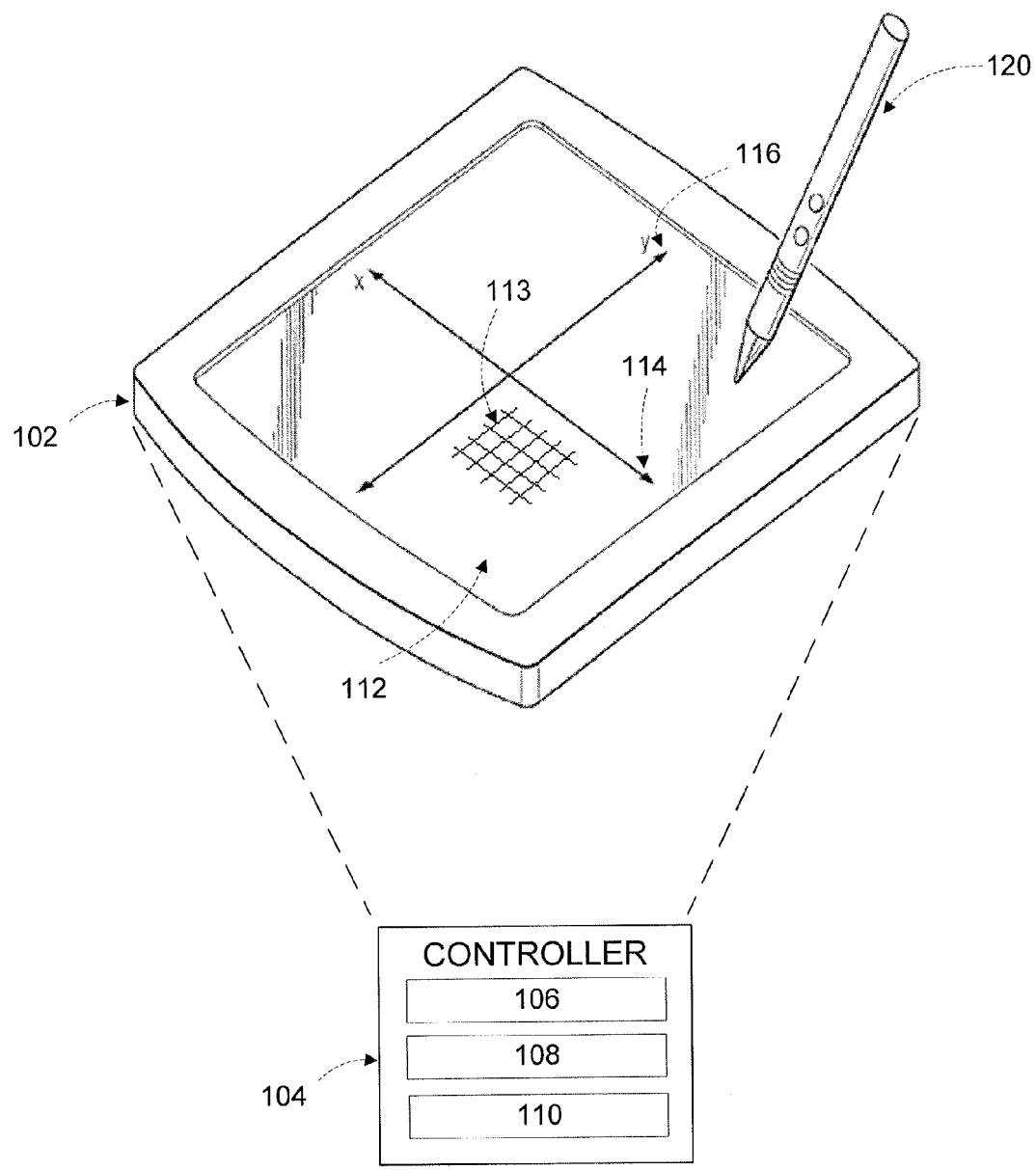
FIG. 1 illustrates an example touch-sensing system, according to certain embodiments of the present disclosure.
Figure 2:
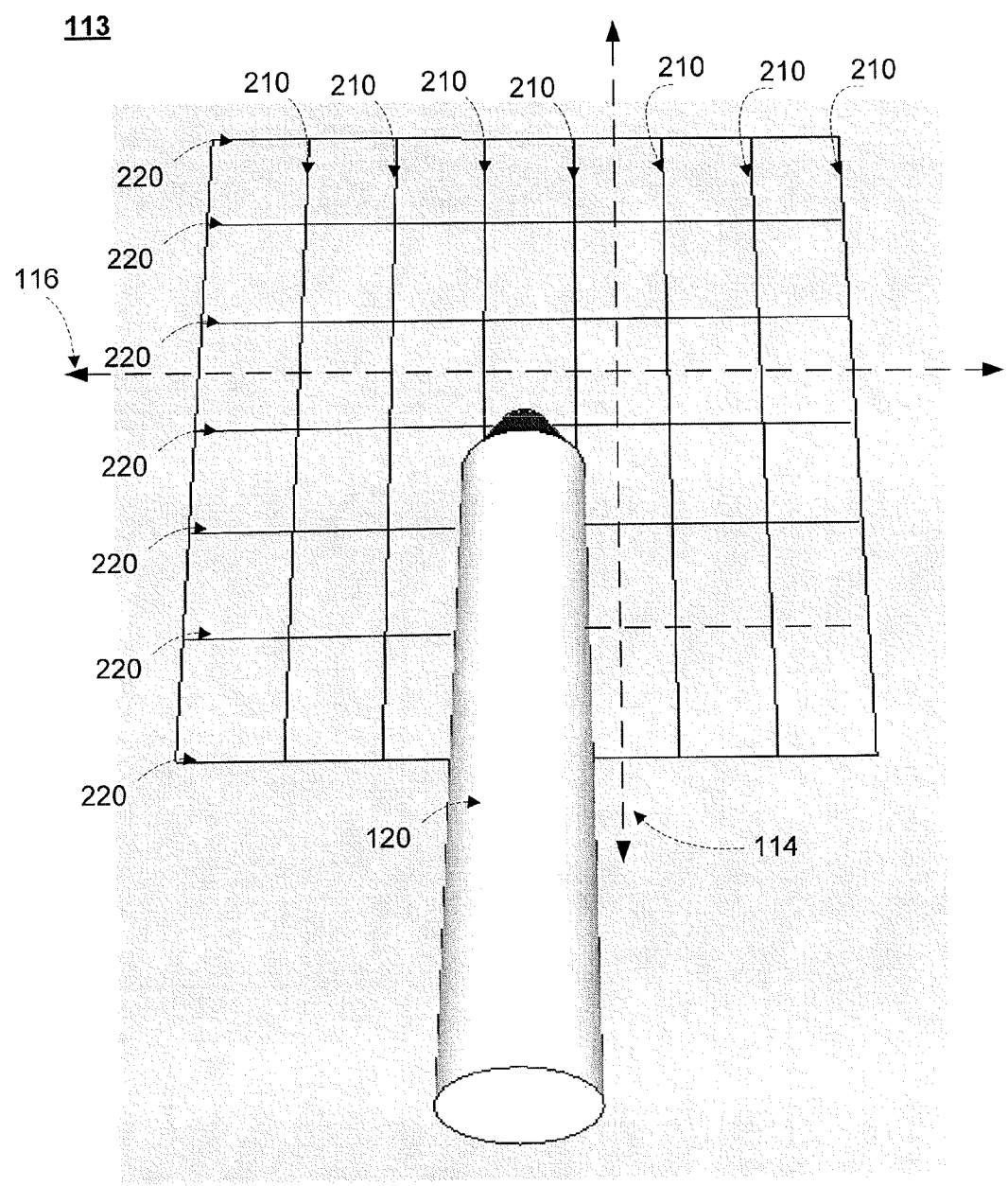
FIG. 2 illustrates an example electrode array and an example stylus that may be used in a touch-sensing system, according to certain embodiments of the present disclosure.
Figure 3:
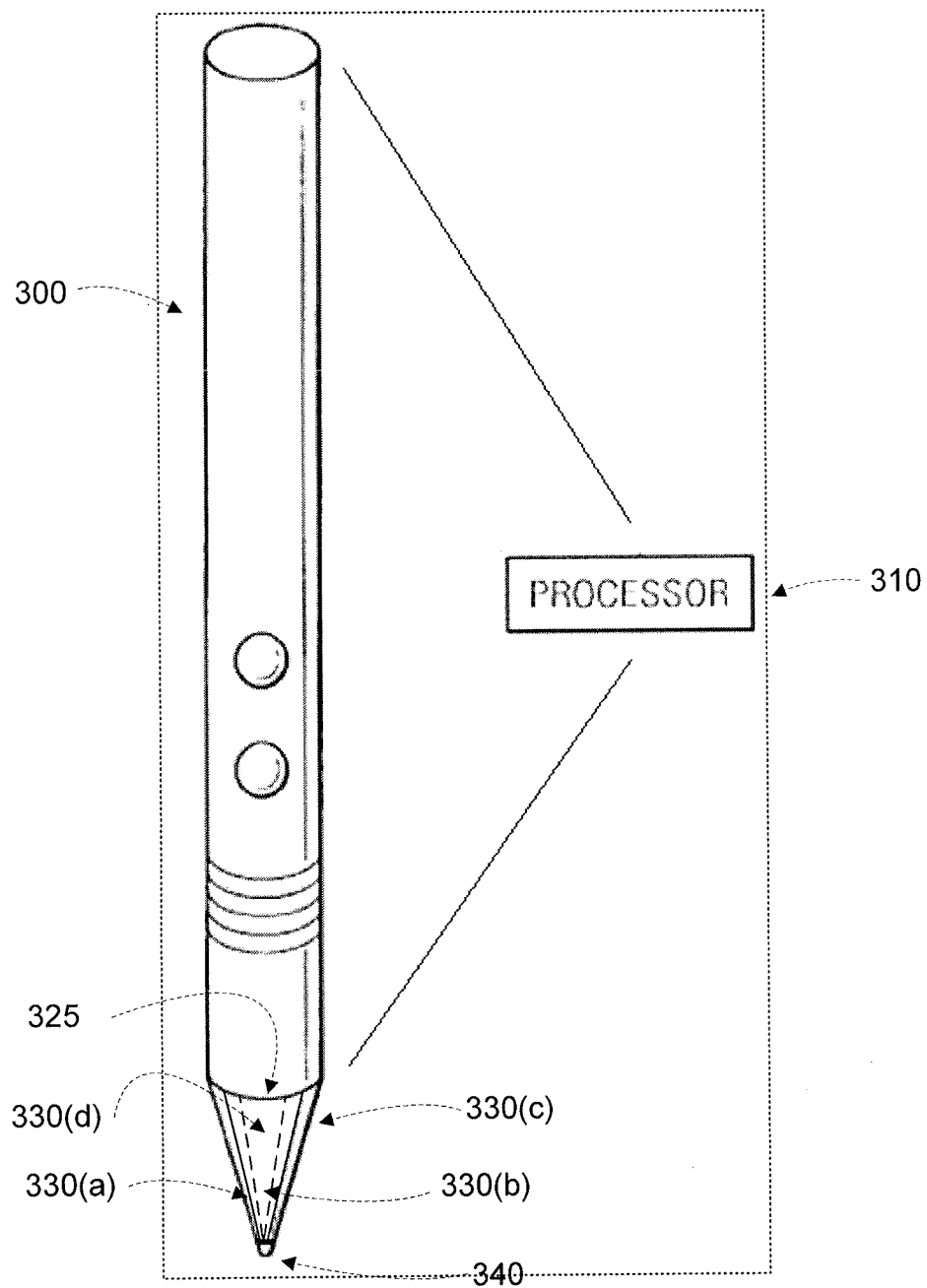
FIG. 3 illustrates an example stylus that may be used in a touch-sensing system, according to certain embodiments of the present disclosure.
Figure 4A:
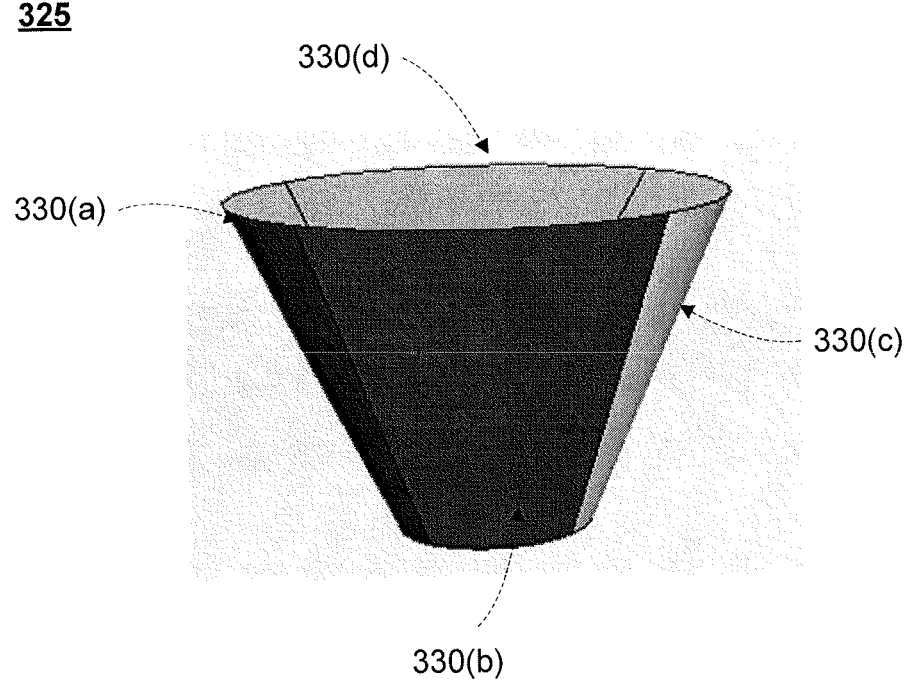
FIG. 4A is a side view of an example stylus collar with at least four receivers, according to certain embodiments of the present disclosure.
Figure 4B:
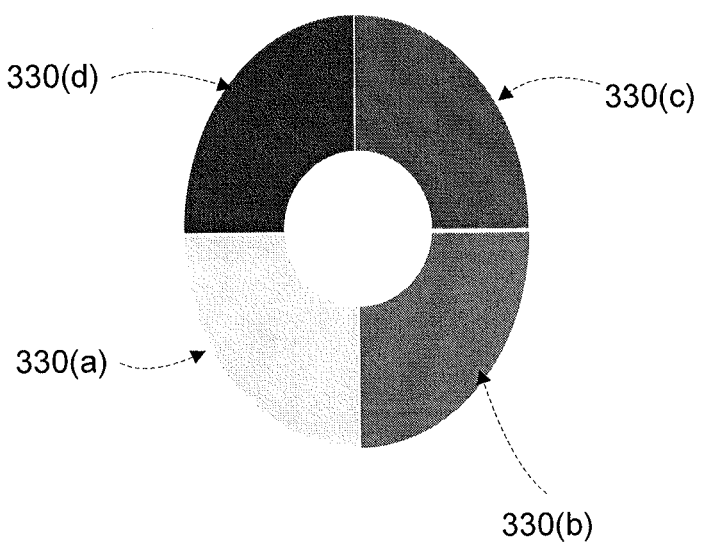
FIG. 4B is a top view of an example stylus collar with at least four receivers, according to certain embodiments of the present disclosure.
Figure 5A:
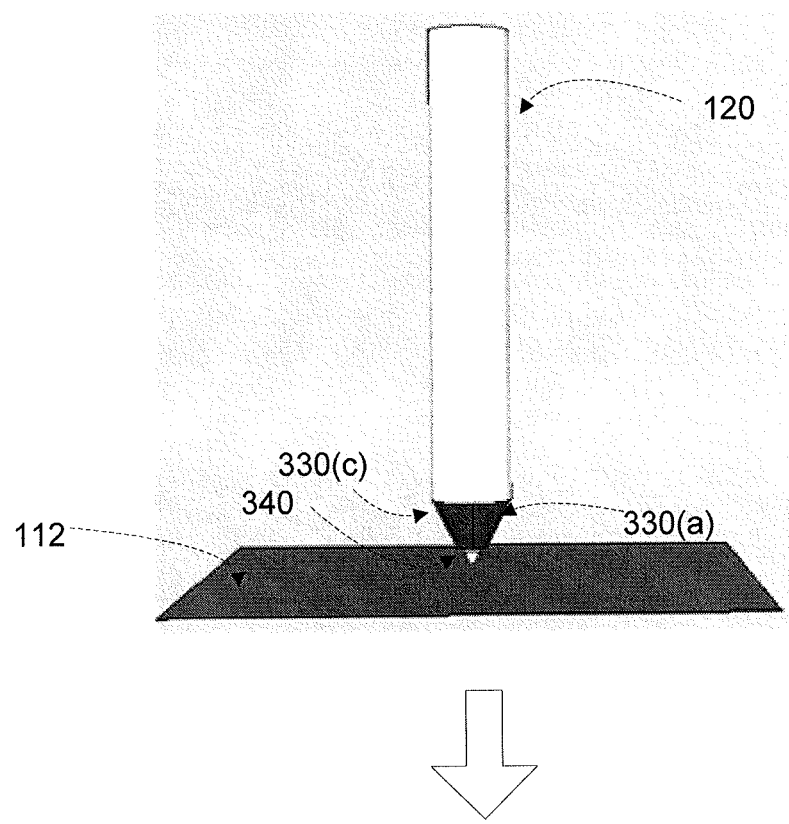
FIG. 5A illustrates an example stylus in a vertical position, according to certain embodiments of the present disclosure.
Figure 5B:
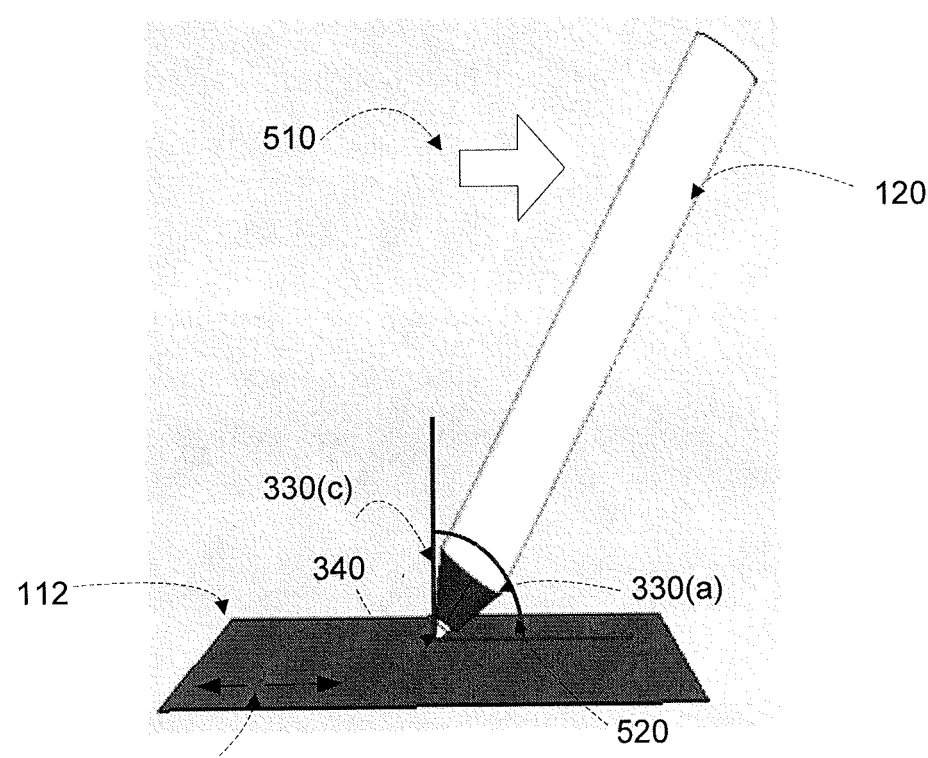
FIG. 5B illustrates an example stylus in a tilted position having a tilt direction and tilt magnitude, according to certain embodiments of the present disclosure.
Figure 6:
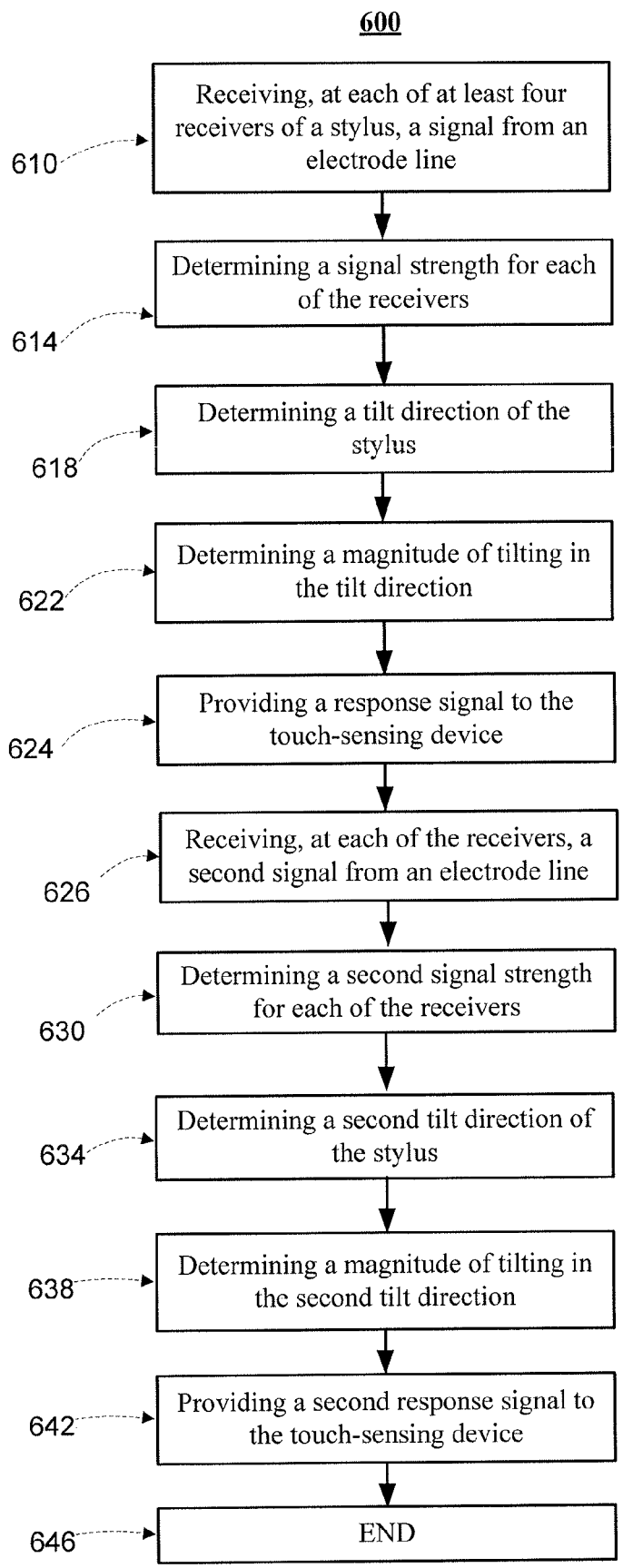
FIG. 6 is a flow chart illustrating an example method for determining stylus tilt in relation to a touch-sensitive device, according to certain embodiments of the present disclosure.

Additional details are discussed in FIGS. 1 through 6. FIG. 1 shows an example touch-sensing system, while FIG. 2 illustrates an example electrode array that may be used in a touch-sensing system. FIG. 3 shows an example stylus with at least four receivers that may be used in a touch-sensing system. FIGS. 4A and 4B show an example collar with four receivers that may be used in a stylus. FIG. 5A shows an example stylus in a vertical orientation, and FIG. 5B shows an example stylus having a tilt direction and magnitude. FIG. 6 illustrates an example method for determining stylus tilt direction in relation to a touch-sensitive device.

FIG. 1 illustrates an example touch-sensing system 100, according to certain embodiments of the present disclosure. Touch-sensing system 100 includes touch-sensing device 102 and stylus 120. Touch-sensing device 102 may be a tablet computer, smart phone, touchpad, or other device configured to detect the presence of stylus 120. In certain embodiments, touch-sensing device 102 includes touch-sensor controller 104, touch-sensitive area 112, and electrode array 113. In an embodiment, touch-sensor controller 104 controls the sending of signals to stylus 120 and processes response signals received from stylus 120.

Touch-sensor controller 104 may be implemented by one or more integrated circuits (ICs), such as for example general-purpose microprocessors, microcontrollers, programmable logic devices or arrays, application-specific ICs (ASICs). Touch-sensor controller 104 comprises analog circuitry, digital logic, and digital non-volatile memory in particular embodiments. Touch-sensor controller 104 is disposed on a flexible printed circuit (FPC) bonded to the substrate of a touch sensor in certain embodiments. The FPC may be active or passive, where appropriate. Multiple touch-sensor controllers 104 are disposed on the FPC in an embodiment. Touch-sensor controller 104 may include a processor unit 106, a drive unit 108, and a storage unit 110. Drive unit 108 may supply drive signals to the drive electrodes of electrode array 113. Processor unit 106 may control the supply of drive signals to the drive electrodes by drive unit 108 and process response signals from stylus 120. Processor unit 106, for example, may receive response signals that indicate the tilt direction and magnitude of stylus 120. In that example, processor unit 106 may use the tilt direction and magnitude information to correct the position of stylus 120. This provides the advantage of increasing touch-position accuracy. Storage unit 110 may store programming for execution by processor unit 106, including programming for controlling drive unit 108 to supply drive signals to the drive electrodes, programming for processing response signals from stylus 120, and other suitable programming, where appropriate. Although this disclosure describes a particular touch-sensor controller having a particular implementation with particular components, this disclosure contemplates any suitable touch-sensor controller having any suitable implementation with any suitable components.

Touch-sensing device 102 includes one or more touch-sensitive areas 112 in certain embodiments. Touch-sensitive areas 112 include electrode array 113 in an embodiment. As discussed below, electrode array 113 may be a plurality of electrode lines, which may be drive and sense electrodes (or an array of electrodes of a single type), disposed on one or more substrates, which may be made of a dielectric material. Electrode array 113 includes electrode lines oriented along first axis 114 and electrode lines oriented along second axis 116 in certain embodiments. In some embodiments, first axis 114 is oriented in a different direction than second axis 116. Although electrode array 113 is illustrated in FIG. 1 as having a certain configuration in a particular location of touch-sensing device 102, electrode array 113 may have any configuration and be located in any area of touch-sensing device 102.

Stylus 120 may be an active stylus configured to communicate with touch-sensing device 102. Stylus 120 may interact or communicate with touch-sensing device 102 when brought in contact with or in proximity to touch-sensitive area 112. Interaction between stylus 120 and touch-sensing device 102 may be capacitive or inductive in some embodiments. For example, when stylus 120 is brought in contact with or in proximity to touch-sensitive area 112, signals generated by stylus 120 may influence capacitive electrodes of touch-sensing device 102, or signals generated by touch-sensing device 102 may influence capacitive electrodes of stylus 120. A power source of stylus 120 may be inductively charged by touch-sensing device 102, or a power source of touch-sensing device 102 may be charged by stylus 120 in some embodiments. Other embodiments may utilize any suitable method of interaction and/or communication between stylus 120 and touch-sensing device 102 in place of or in addition to capacitance and induction, such as mechanical forces, current, voltage, or electromagnetic fields. The capacitive coupling, inductive coupling, and other coupling mechanisms may be utilized for a variety of purposes, such as detecting a position of stylus 120 and communicating information between stylus 120 and touch-sensing device 102.

FIG. 2 illustrates an example electrode array 113 and an example stylus 120 that may be used in touch-sensing system 100, according to certain embodiments of the present disclosure. As discussed above, touch-sensing system 100 may include touch-sensing device 102, which has electrode array 113. Electrode array 113 can be used to send signals to and receive signals from stylus 120 in certain embodiments. Electrode array 113 may include plurality of electrode lines 210 and plurality of electrode lines 220 in an embodiment. Electrode lines 210 and 220 may be any suitable electrode line configured to emit a signal that may be received by stylus 120 or receive a signal sent from stylus 120 in an embodiment. Electrode lines 210 and 220 may emit a signal in a known order in certain embodiments. For example, each of electrode lines 210 may emit a signal sequentially, beginning from the left-most electrode line of electrode lines 210 and ending with the right-most electrode line of electrode lines 210 in FIG. 2. As another example, each of electrode lines 220 may emit a signal sequentially, beginning from the top-most electrode line of electrode lines 220 and ending with the bottom-most electrode line of electrode lines 220 in FIG. 2.

Electrode lines 210 may be oriented along first axis 114 and electrode lines 220 may be oriented along second axis 116 in an embodiment. First axis 114 and second axis 116 are oriented in different directions in certain embodiments. First axis 114 may intersect second axis 116 at a ninety-degree angle as an example. First axis 114 may intersect second axis 116 at a forty-five-degree angle as another example. First axis 114 may intersect second axis 116 at any angle such that the first axis 114 and second axis 116 are oriented in different directions as another example. Although electrode lines 210 and 220 are illustrated in a particular pattern, any particular electrode-line pattern may be used, such as a diamond-shaped pattern.

As an example of operation, touch-sensor controller 104 causes each of electrode lines 210 oriented along first axis 114 to emit a signal in a known order, such as sequentially. As discussed below, stylus 120 may then receive one or more of the emitted signals. Stylus 120 uses the received signal to determine a tilt direction along second axis 116 of touch-sensing device 102 based on the signal strength of the received signal at a plurality of the receivers of stylus 120. For example, stylus 120 may determine a tilt direction along second axis 116 by comparing the signal strength of the received signal at each of stylus's 120 at least four receivers (discussed below). In that example, if the signal strength is greater at a receiver on the left of stylus 120 than at a receiver on the right of stylus 120, then stylus 120 is tilting left along axis 116 towards the receiver having the greater signal strength. The received signal also allows stylus 120 to determine a tilt magnitude (e.g., angle of tilt of stylus 120 in relation to touch-sensing device 102) of stylus 120 along second axis 116 of touch-sensing device 102. Stylus 120 can compare the signal strength of the received signal at a receiver on the top of stylus 120 with a signal strength of the received signal at a receiver on the bottom of stylus 120 to determine that the tilt magnitude is high for example. After determining a tilt direction, stylus 120 may then emit a response signal that is received by electrode array 113. This response signal allows touch-sensor controller 104 to correct the touch position of stylus 120.

FIG. 3 illustrates an example stylus 120 that may be used in touch-sensing system 100, according to certain embodiments of the present disclosure. Stylus 120 may be used in touch-sensing system 100 for any application. Stylus 120 may be used to determine a tilt direction and a tilt magnitude of stylus 120 in relation to touch-sensing device 102 for example. Stylus 120 may be used to play a game on touch-sensing device 102 as another example. Stylus 120 may be used to draft an e-mail on touch-sensing device 102 as yet another example. Stylus 120 includes body 300, processor 310, collar 325, at least four receivers 330(a)-(d), and transmitter 340 in certain embodiments.

Body 300 may be used to house components of stylus 120 in an embodiment. Body 300 is generally the component that the user holds when writing with stylus 120. Body 300 may be made in any suitable shape. Body 300 may be cylindrical in shape for example. Body 300 may have a wavy shape as another example. Body 300 may be made using any material.

Body 300 may be plastic for example. Body 300 may be metal as another example. Body 300 houses processor 310 in an embodiment.

Processor 310 of stylus 120 may be any suitable processing device configured to carry out the operations of stylus 120. For example, processor 310 may be configured to determine a tilt direction of stylus 120 as discussed below with respect to FIG. 6. Processor 310 may also be configured to determine a tilt magnitude of stylus 120 as another example. Processor 310 may also control other functions of stylus 120. Processor 310 may determine the remaining battery life of any batteries powering stylus 120 for example. Processor 310 controls the sending of a response signal from stylus 120 to touch-sensing device 102 in an embodiment. For example, once processor 310 determines a tilt direction of stylus 120, processor 310 may cause transmitter 340 to transmit a response signal indicating the tilt direction to touch-sensing device 102. Processor 310 may cause transmitter 340 to transmit a response signal indicating a tilt magnitude of stylus 120 to touch-sensing device 102 as another example. Processor 310 may cause transmitter 340 to transmit a response signal that indicates both tilt direction and tilt magnitude to touch-sensing device 102 as yet another example. Processor 310 may be coupled to collar 325 and transmitter 340. Generally, any suitable component configured to communicate a signal may couple processor 310 to collar 325 or transmitter 340. For example, processor 310 may be coupled to collar 325 or transmitter 340 using wires. Processor 310 may be coupled to collar 325 or transmitter 340 using a wireless connection as another example.

Stylus 120 also includes collar 325 in certain embodiments. Collar 325 is generally a plurality of receivers configured to receive at least one signal from touch-sensing device 102. Collar 325 may be coupled to body 300 in any manner. Collar 325 may be any suitable shape. For example, collar 325 may be conical in shape. Collar 325 may be hemispherical in shape as another example. Collar 325 includes at least four receivers 330(a)-(d) in an embodiment. Receivers 330(a)-(d) may be any suitable receiver configured to receive signals from touch-sensing device 102. Each of receivers 330(a)-(d) may receive the same emitted signal. For example, if an electrode line to the left of receivers 330(a)-(d) emits a signal, each of receivers 330(a)-(d) may receive the emitted signal. However, the received signal may have a different signal strength at each of receivers 330(a)-(d) because each of receivers 330(a)-(d) is a different distance from the electrode line that emitted the signal. For example, when an electrode line that is to the left of receivers 330(a)-(d) emits a signal, a left-most receiver of receivers 330(a)-(d) may have a greater received signal strength than a right-most receiver of receivers 330(a)-(d). This also indicates that stylus 120 is tilting to the left in relation to touch-sensing device 102. Each of receivers 330(a)-(d) may be coupled to processor 310. For example, each of receivers 330(a)-(d) may be coupled to processor 310 using separate wires. Each of receivers 330(a)-(d) may be coupled to processor 310 using a wireless connection as another example. This connection allows receivers 330(a)-(d) to transmit the received signal to processor 310. After receiving the signal, receivers 330(a)-(d) may each communicate the received signal to processor 310, which determines the signal strength for the received signal at each of receivers 330(a)-(d).

Stylus 120 also includes transmitter 340, which may be configured to send response signals from stylus 120 to touch-sensing device 102 in some embodiments. Transmitter 340 may be any suitable transmitter capable of sending signals to touch-sensing device 102. Transmitter 340 is coupled to processor 310 in certain embodiments. For example, transmitter 340 may be coupled to processor 310 using a wired connection. Transmitter 340 may be coupled to processor 310 using a wireless connection as another example. This connection allows processor 310 to cause transmitter 340 to transmit response signals to touch-sensing device 102. After processor 310 determines a tilt direction of stylus 120, processor 310 may cause transmitter 340 to transmit a response signal to touch-sensing device 102 for example. A response signal may include information indicative of a tilt direction of stylus 120 in certain embodiments. In other embodiments, a response signal may include information indicative of a tilt magnitude of stylus 120. A response signal may be a composite signal in yet other embodiments. A response signal may include information indicative of both tilt direction and tilt magnitude for example. The response signal may also include various other types of information. The response signal may also indicate the battery status of stylus 120 or the pressure on the tip of stylus 120 for example.

FIG. 4A is a side view of an example stylus collar 325 with at least four receivers 330(a)-(d), according to certain embodiments of the present disclosure. As discussed above, collar 325 includes at least four receivers 330(a)-(d) in an embodiment. Receivers 330(a)-(d) may be any suitable receiver configured to receive signals from touch-sensing device 102. Additionally, having at least four receivers 330(a)-(d) allows processor 310 to determine both a tilt direction and a tilt magnitude by comparing the signal strengths at more than one of receivers 330(a)-(d). Receivers 330(a)-(d) are the same size in an embodiment. For example, each of receivers 330(a)-(d) may be approximately one-fourth of the size of collar 325. Receivers 330(a)-(d) are the same shape in some embodiments. For example, when all four receivers are coupled together, they may form a conical collar 325. When all four receivers are coupled together, they may form a hemispherical collar 325 as another example. Receivers 330(a)-(d) are coupled to processor 310 in certain embodiments. For example, receivers 330(a)-(d) each may be coupled to processor 310 using a wired or wireless connection. This connection enables receivers 330(a)-(d) to each communicate a received signal to processor 310. As an example of operation, electrode lines 210 of touch sensing device 102 may emit a signal that is received by receivers 330(a)-(d). Receivers 330(a)-(d) may each then communicate the received signal to processor 310. The received signal will have a different signal strength at each of receivers 330(a)-(d) as discussed above. The difference in signal strength results from one of the receivers 330(a)-(d) being closer to the electrode line 210 that emitted the signal, which indicates that stylus 120 is tilting in the direction of the receiver of receivers 330(a)-(d) having the stronger signal strength (e.g., if a receiver on the left of collar 325 has a stronger received signal strength than a receiver on the right of collar 325, then stylus 120 is tilting towards the left receiver). This tilt direction information may be used to improve the accuracy of touch-position determinations.

FIG. 4B is a top view of an example stylus collar 325 with at least four receivers 330(a)-(d), according to certain embodiments of the present disclosure. Receivers 330(a)-(d) may be configured and operate in a similar manner as discussed above in FIG. 4A. Receivers 330(a)-(d) may have opening 335 in the center of receivers 330(a)-(d). This opening 335 allows for a connection between transmitter 340 and processor 310. For example, opening 335 allows for a wire to run from processor 310 to transmitter 340.

FIG. 5A illustrates an example stylus 120 in a vertical position, according to certain embodiments of the present disclosure. Stylus 120 is illustrated in a vertical position with respect to touch-sensitive area 112 of touch-sensing system 100. In this illustration, transmitter 340 has its tip, and only the tip, touching touch-sensitive area 112. In other words, there is a perfect ninety-degree angle between the tip of transmitter 340 and touch-sensitive area 112. When only the tip of transmitter 340 contacts touch-sensitive area 112, the reported position of stylus 120 is precise (i.e., just the tip, which is about one millimeter wide) and there would not need to be any touch-position correction. However, most people do not write using a perfect vertical orientation. Rather, most people tilt stylus 120 to the right or left depending on whether they are right handed or left handed. For example, right-handed users often hold stylus 120 tilted to the right as shown in FIG. 5B. Additionally, when a user is holding touch-sensing device 102, the user may also tilt touch-sensing device 102 in any direction. For example, the user may tilt touch-sensing device 102 to the right or left instead of using the device on a flat surface, such as a table. Together, this tilting cause errors in the reported touch position of stylus 120 because the width of transmitter 340, which may be up to four millimeters, rather than just the tip, contacts touch-sensitive area 112.

FIG. 5B illustrates an example stylus 120 in a tilted position having tilt direction 510 and tilt magnitude 520, according to certain embodiments of the present disclosure. As noted above, many users tilt stylus 120 in a particular direction depending on whether they are right handed or left handed. In an embodiment, tilt direction 510 is a direction of tilt of stylus 120 in relation to an axis, such as second axis 116, of touch-sensitive area 112. As illustrated in FIG. 5B, for example, stylus 120 has tilt direction 510 to the right along second axis 116 of touch-sensitive area 112, which indicates that the user is a right-handed writer. In this illustration, transmitter 340 is not perfectly upright with respect to touch-sensitive area 112 due to tilt direction 510. This tilting causes an erroneous reported position of stylus 120 because the width of transmitter 340 is in contact with or in proximity to touch-sensitive area 112. In that example, position correction to the left is desirable because the erroneous position of transmitter 340 is reported as being the width of transmitter 340, which is to the right of the actual tip position of transmitter 340. Additionally, stylus 120 is tilting with tilt magnitude 520. In certain embodiments, tilt magnitude 520 may represent an angle of tilt in relation to touch-sensitive area 112. Tilt magnitude 520 may represent an angle of tilt of the stylus in relation to an axis that is parallel to touch-sensitive area 112 for example. Tilt magnitude 520 may represent an angle of tilt of the stylus in relation to an axis that is perpendicular to touch-sensitive area 112 as another example. In this manner, the angle of tilt is measured in relation to the angle of touch-sensitive device 102. Generally, an increased angle of tilt causes greater error in position reporting because more of the width of transmitter 340 is in contact with or in proximity to touch-sensitive area 112. For example, as a user increases an angle of tilt of stylus 120 in relation to touch-sensitive area 112, tilt magnitude 520 increases as indicated by an increased signal strength of a receiver of receivers 330(a)-(d) on the bottom of stylus 120. This increase signal strength is caused by receiver 330(a) being closer to touch-sensitive area 112 in an embodiment. As another example, the user may keep stylus 120 at a fixed angle, but tilt touch-sensing device 102, which may increase an angle of tilt of stylus 120 in relation to touch-sensitive area 112 of touch-sensing device 102. To correct the touch position in a situation in which stylus 120 is tilting in tilt direction 510 with tilt magnitude 520, the reported touch position will need to be moved to the left in an embodiment. This can be done by determining tilt direction 510 and tilt magnitude 520 using processor 310 of stylus 120 as will be described by the flowchart of FIG. 6.

FIG. 6 is a flow chart illustrating an example method for determining stylus 120 tilt in relation to touch-sensitive device 102, according to certain embodiments of the present disclosure. Method 600 begins at step 610 where stylus 120 receives, at each of at least four receivers 330(a)-(d) of stylus 120, a signal emitted from an electrode line oriented along first axis 114 of touch-sensing device 102 in an embodiment. Each of receivers 330(a)-(d) may receive the same emitted signal. As discussed below, however, the received signal may have a different signal strength at each of receivers 330(a)-(d). Electrode line may be one of electrode lines 210 oriented along first axis 114 in an embodiment. Electrode lines 210 may each emit a signal, such as a drive signal. Electrode lines 210 may emit signals in a known order. For example, electrode lines 210 may each sequentially emit a signal, starting with a left-most electrode line and ending with a right-most electrode line. In this manner, processor 310 of stylus 120 can determine from which direction the signal was emitted. Once an emitted signal is received, each of receivers 330(a)-(d) send the signal to processor 310 using any suitable connection, such as a wire.

At step 614, processor 310 determines a signal strength of the received signal at each of receivers 330(a)-(d) in an embodiment. As discussed below, processor 310 may use the determined signal strengths to determine tilt direction 510 of stylus 120. Generally, each of receivers 330(a)-(d) will have a different signal strength depending on their distance from the electrode line that emitted the signal. For example, if receiver 330(a) is closer to the electrode line that emitted the signal than receiver 330(c), the signal strength of the signal at receiver 330(a) may be greater than the signal strength at receiver 330(c). Once processor 310 determines the signal strength at receivers 330(a)-(d), processor 310 can use this information to determine tilt direction 510 and tilt magnitude 520 along second axis 116 in certain embodiments.

At step 618, processor 310 of stylus 120 determines tilt direction 510 of stylus 120 in an embodiment. Tilt direction 510 is a direction of stylus 120 along second axis 116 of touch-sensing device 102 in some embodiments. Processor 310 may determine tilt direction 510 based on the determined signal strengths at a plurality of receivers 330(a)-(d) in an embodiment. Processor 310 determines tilt direction 510 by comparing the signal strength at a first receiver of receivers 330(a)-(d) with the signal strength at a second receiver of receivers 330(a)-(d) in an embodiment. As an example, if the signal strength of the received signal is greater at receiver 330(a) than the signal strength at 330(c), then stylus 120 is tilting in tilt direction 510 towards receiver 330(a) along second axis 116. In that example, the stronger signal strength at receiver 330(a) indicates that receiver 330(a) is a shorter distance from the electrode line that emitted the signal. Once processor 310 compares the signal strengths at at least two of the receivers, processor 310 can determine tilt direction 510 along second axis 116. The determined tilt direction 510 will be towards the first receiver along second axis 116 when the signal strength at the first receiver is greater than the signal strength at the second receiver. If the signal strength at the second receiver is greater than the signal strength at the first receiver, then tilt direction 510 is towards the second receiver along second axis 116.

At step 622, processor 310 determines a magnitude of tilting 520 in tilt direction 510. Magnitude of tilting 520 represents an angle of tilt of stylus 120 in relation to touch-sensitive area 112 in an embodiment. Magnitude of tilting 520 may represent an angle of tilt of stylus 120 in relation to an axis that is parallel to touch-sensitive area 112 as an example. Processor 310 determines magnitude of tilting 520 by comparing the signal strength of the received signal at a plurality of receivers 330(a)-(d) in some embodiments. Processor 310 compares the signal strengths at a receiver of receivers 330 (a)-(d) that is on top of stylus 120 with a receiver that is on the bottom of stylus 120 in certain embodiments. A larger difference between the two signal strengths may indicate a greater tilt magnitude 520. Generally, the receiver of receivers 330 (a)-(d) that is on the bottom of stylus 120 will have a higher signal strength than the receiver that is on top because it is closer to touch-sensitive area 112 of touch-sensing device 102.

At step 624, processor 310 provides a response signal to touch-sensing device 102. Processor 310 causes transmitter 340 to send the response signal to touch-sensing device 102 in an embodiment. A response signal may indicate tilt direction 510 along second axis 116. The response signal may be a composite signal that indicates both tilt direction 510 along second axis 116 as well as magnitude of tilting 520 along second axis 116 in other embodiments. A response signal may include various other information from stylus 120 in yet other embodiments. For example, a response signal may also indicate battery status and stylus tip pressure.

At step 626, receivers 330(a)-(d) may receive a second signal from an electrode line 220 oriented along second axis 116 in a similar manner as in step 610. At step 630, processor 310 may determine a second signal strength for each of receivers 330(a)-(d) in a similar manner as in step 614. At step 634, processor 310 may determine a second tilt direction 510 of stylus 120 along first axis 114 in a similar manner as in step 618. Second tilt direction 510 is a direction of stylus 120 along first axis 114 of touch-sensing device 102. As noted above, first axis 114 and second axis 116 are oriented in different directions. At step 638, processor 310 may determine a second magnitude of tilting 520 in second tilt direction 510 in a similar manner as in step 622.

At step 642, processor 310 provides a second response signal to touch-sensing device 102 in a similar manner as in step 624. However, the second response signal may indicate a tilt direction along first axis 114 in an embodiment. The second response signal may be a composite signal as discussed above. In an embodiment, touch-sensor controller 104 of stylus 120 may combine the information contained in the first response signal (e.g., the tilt direction along second axis 116) with the information contained in the second response signal (e.g., the tilt direction along first axis 114) to correct the touch position of stylus 120. At steps 646, the method ends.

As an example embodiment of operation, receivers 330(a)-(d) receive a signal from electrode lines 210 oriented along first axis 114. Processor 310 may determine a signal strength of the received signal at each of receivers 330(a)-(d). Generally, the signal strength at each of receivers 330(a)-(d) will have a different signal strength. Processor 310 determines tilt direction 510 of stylus 120 based on the determined signal strength at a plurality of receivers 330(a)-(d). Tilt direction 510 may be a direction of stylus 120 along second axis 116 of touch-sensing device 102. Transmitter 340 may then send a response signal to touch-sensing device 102 indicating tilt direction 510. In this manner, a response signal that includes tilt direction 510 is provided that allows touch-sensing device 102 to correct the touch position of stylus 120 using tilt direction 510. This provides the advantage of increased accuracy of touch position determinations.

Method 600 illustrates an example method for determining stylus 120 tilt in relation to touch-sensitive device 102. Modifications, additions, or omissions may be made without departing from the scope of this disclosure. Steps may be combined, modified, or deleted where appropriate, and additional steps may be added. For example, steps 626 through steps 642 may be omitted. As another example, method 600 may proceed directly from step 618 to step 624. As yet another example, method 600 may omit step 622.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    receiving, at each of at least four receivers of a stylus, a signal from an electrode line oriented along a first axis of a touch-sensing device;
    determining, by a processor of the stylus, a signal strength of the signal at each of the at least four receivers of the stylus, the signal having a different signal strength at each of the at least four receivers;
    determining, by the processor of the stylus, a tilt direction of the stylus based on the determined signal strength at a plurality of the at least four receivers, wherein the tilt direction comprises a direction of the stylus along a second axis of the touch-sensing device, the second axis being oriented in a different direction than the first axis; and
    providing, by a transmitter of the stylus, a response signal to the touch-sensing device, the response signal comprising information indicative of the tilt direction of the stylus.

2. The method of claim 1, wherein determining, by the processor of the stylus, the tilt direction of the stylus based on the determined signal strength at the plurality of the at least four receivers comprises:
    comparing the signal strength at a first receiver of the receivers with the signal strength at a second receiver of the receivers, wherein the determined tilt direction is towards the first receiver when the signal strength at the first receiver is greater than the signal strength at the second receiver.

3. The method of claim 1, further comprising:
    determining, by the processor of the stylus, a magnitude of tilting of the stylus in the direction by comparing the signal strength at a third receiver of the receivers with the signal strength at a fourth receiver of the receivers.

4. The method of claim 1, wherein the response signal further comprises information indicative of a battery status of the stylus.

5. The method of claim 3, wherein the response signal further comprises information indicative of the magnitude of tilt of the stylus.

6. The method of claim 1, further comprising:
    receiving, at each of the at least four receivers of the stylus, a second signal from a second electrode line oriented along the second axis of the touch-sensing device;
    determining, by the processor of the stylus, a second signal strength of the second signal at each of the at least four receivers of the stylus, the second signal having a second different signal strength at each of the at least four receivers; and determining, by the processor of the stylus, a second tilt direction of the stylus along the first axis of the touch-sensing device based on the determined second signal strength at the plurality of the at least four receivers.

7. The method of claim 6, further comprising:
providing, by the transmitter of the stylus, a second response signal to the touch-sensing device, the second response signal comprising information indicative of the second tilt direction of the stylus.

8. A system comprising:
a touch-sensing device comprising:
an electrode array comprising an electrode line oriented along a first axis of the touch-sensing device;
a touch-sensor controller coupled to the electrode array and configured to control the sending of a signal by the electrode line; and
a stylus comprising:
at least four receivers each configured to receive the signal;
a processor coupled to the at least four receivers, the processor operable to:
determine a signal strength of the signal at each of the at least four receivers of the stylus, the signal having a different signal strength at each of the at least four receivers; and
determine a tilt direction of the stylus based on the determined signal strength at a plurality of the at least four receivers, wherein the tilt direction comprises a direction of the stylus along a second axis of the touch-sensing device, the second axis being oriented in a different direction than the first axis; and
a transmitter coupled to the processor configured to provide a response signal to the touch-sensing device, the response signal comprising information indicative of the tilt direction of the stylus.

9. The system of claim 8, wherein the processor is further operable to determine the tilt direction of the stylus based on the determined signal strength at the plurality of the at least four receivers by:
comparing the signal strength at a first receiver of the receivers with the signal strength at a second receiver of the receivers, wherein the determined tilt direction is towards the first receiver when the signal strength at the first receiver is greater than the signal strength at the second receiver.

10. The system of claim 8, wherein the processor is further operable to:
determine a magnitude of tilting in the determined tilt direction by comparing the signal strength at a third receiver of the receivers with the signal strength at a fourth receiver of the receivers.

11. The system of claim 8, wherein the response signal further comprises information indicative of a battery status of the stylus.

12. The system of claim 10, wherein the response signal comprises information indicative of the tilt direction and the magnitude of tilt of the stylus.

13. The system of claim 8, wherein the at least four receivers are further configured to each receive a second signal from a second electrode line oriented along the second axis of the touch-sensing device; and the processor is further configured to:
determine a second signal strength of the second signal at each of the at least four receivers of the stylus, the second signal having a second different signal strength at each of the at least four receivers; and
determine a second tilt direction of the stylus along the first axis of the touch-sensing device based on the determined second signal strength at the plurality of the at least four receivers.

14. The system of claim 13, wherein the transmitter is further configured to provide a second response signal to the touch-sensing device, the second response signal comprising information indicative of the second tilt direction of the stylus.

15. A stylus comprising:
at least four receivers each configured to receive a signal from an electrode line oriented along a first axis of a touch-sensing device;
a processor coupled to the at least four receivers, the processor operable to:
determine a signal strength of the signal at each of the at least four receivers of the stylus, the signal having a different signal strength at each of the at least four receivers; and
determine a tilt direction of the stylus based on the determined signal strength at a plurality of the at least four receivers, wherein the tilt direction comprises a direction of the stylus along a second axis of the touch-sensing device, the second axis being oriented in a different direction than the first axis; and
a transmitter coupled to the processor configured to provide a response signal to the touch-sensing device, the response signal comprising information indicative of the tilt direction of the stylus.

16. The stylus of claim 15, wherein the processor is further operable to determine the tilt direction of the stylus based on the determined signal strength at the plurality of the at least four receivers by:
comparing the signal strength at a first receiver of the receivers with the signal strength at a second receiver of the receivers, wherein the determined tilt direction is towards the first receiver when the signal strength at the first receiver is greater than the signal strength at the second receiver.

17. The stylus of claim 15, wherein the processor is further operable to:
determine a magnitude of tilting in the determined tilt direction by comparing the signal strength at a third receiver of the receivers with the signal strength at a fourth receiver of the receivers.

18. The stylus of claim 15, wherein the at least four receivers are further configured to receive a second signal from a second electrode line oriented along the second axis of the touch-sensing device; and
the processor is further configured to:
determine a second signal strength of the second signal at each of the at least four receivers of the stylus, the second signal having a second different signal strength at each of the at least four receivers; and
determine a second tilt direction of the stylus along the first axis of the touch-sensing device based on the determined second signal strength at the plurality of the at least four receivers.

19. The stylus of claim 18 wherein the transmitter is further configured to provide a second response signal to the touch-sensing device, the second response signal comprising information indicative of the second tilt direction of the stylus.

* * * * *